(12) United States Patent
Ishida et al.

(10) Patent No.: US 7,540,348 B2
(45) Date of Patent: Jun. 2, 2009

(54) POWER UNIT FOR MOTORCYCLE AND MOTORCYCLE

(75) Inventors: Yousuke Ishida, Shizuoka-ken (JP); Akifumi Oishi, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 532 days.

(21) Appl. No.: 11/300,680

(22) Filed: Dec. 14, 2005

(65) Prior Publication Data

US 2006/0124372 A1   Jun. 15, 2006

(30) Foreign Application Priority Data

Dec. 14, 2004   (JP) .............................. 2004-361679

(51) Int. Cl.
*B62K 11/00* (2006.01)
(52) U.S. Cl. ...................................... 180/228; 280/291
(58) Field of Classification Search ................. 180/228, 180/230

See application file for complete search history.

(56) References Cited

U.S. PATENT DOCUMENTS

| | | | |
|---|---|---|---|
| 6,454,040 B1* | 9/2002 | Fukuda | 180/374 |
| 7,055,509 B2* | 6/2006 | Hara | 123/572 |
| 7,374,510 B2* | 5/2008 | Unno et al. | 477/44 |
| 2006/0122017 A1* | 6/2006 | Masuda et al. | 474/144 |
| 2006/0128510 A1* | 6/2006 | Masuda et al. | 474/8 |

FOREIGN PATENT DOCUMENTS

| | | | |
|---|---|---|---|
| JP | 09-175465 | | 7/1997 |
| JP | 2006-342815 A | * | 12/2006 |

* cited by examiner

*Primary Examiner*—Paul N Dickson
*Assistant Examiner*—Tashiana Adams
(74) *Attorney, Agent, or Firm*—Knobbe, Martens, Olson & Bear, LLP (57) ABSTRACT

A power unit of a motorcycle includes a case that contains a centrifugal clutch 34. A support member is disposed below the case to support first and second foot rests that extend laterally of the case. The case has an underside and at least one boss that extends downward from the underside at a location generally below the centrifugal clutch. The support member is secured to the at least one boss.

19 Claims, 12 Drawing Sheets

POWER UNIT FOR MOTORCYCLE AND MOTORCYCLE

CROSS-REFERENCE TO RELATED APPLICATIONS

This application claims the priority benefit of Japanese Patent Application No. 2004-361679, filed on Dec. 14, 2004, which is hereby incorporated by reference in its entirety.

BACKGROUND OF THE INVENTION

1. Field of the Invention

The present invention generally relates a foot rest support member of a motorcycle, such as a scooter. In particular, the present invention relates to a power unit for a motorcycle in which a foot rest support member is secured to an underside of a crankcase.

2. Description of the Related Art

Motorcycles sometimes feature left and right footrests that are secured by a support member to a crankcase of an associated engine. The support member usually has a coupling rod that extends between the foot rests and a mount plate that is welded to an axially intermediate portion of the coupling rod.

The coupling rod passes extends transversely across the vehicle at a location generally below the crankcase. The mount plate faces a central portion of the underside of the crankcase. The crankcase has a plurality of columnar protrusions in a central region of its underside. The protrusions are formed integrally with the crankcase and extend downward from the underside of the crankcase. The mount plate is secured to the lower ends of the protrusions with bolts. An example of such a construction can be found in Japanese Patent Application Hei 9-175,465.

As shown and described in the Japanese reference, the protrusions are located on the rear half of the crankcase. Generally, the rear half of the crankcase houses the gears of a geared transmission. Thus, the rear half of the crankcase typically has a smaller vertical dimension relative to a forward half of the crankcase, which typically contains a crankshaft and an oil pan. In other words, the underside of the rear half of the crankcase is vertically higher above the surface on which the motorcycle is operated than the front half thereof.

As can be appreciated, the mounting position of the engine, in particular the vertical clearance between the engine and the surface on which the motorcycle is operated on, is at least partially determined by a tradeoff between achieving good road clearance and achieving a low center of gravity for the motorcycle. In the prior configurations, the rear half of the crankcase is vertically higher above the road relative to the forward portion of the crankcase. Therefore, the protrusions had to be rather long in order to properly position the footrests relative to the rest of the motorcycle. The length of the protrusions was not desired because the foot rests support the weight of the rider and, therefore, the support member and the protrusions of the crankcase must have a strong and rigid structure to sufficiently support the load from the foot rests. Thus, reinforcement structures would be employed to bolster the strength of the relevant components, which added complication, cost and weight to the final construction.

SUMMARY OF THE INVENTION

Thus, one aspect of the present invention involves a power unit for a motorcycle. The power unit comprises a case that defines a clutch chamber. The case comprises an underside. A plurality of bosses extends downward from the underside of the case. A centrifugal clutch is positioned within the clutch chamber and the plurality of bosses is positioned generally below the centrifugal clutch. A first foot rest is positioned to a first lateral side of the case and a second foot rest is position to a second lateral side of the case. A support member is disposed generally vertically below the case. The support member is connected to the first and second foot rests and is coupled to the plurality of bosses.

Another aspect of the present invention involves a power unit for a motorcycle. The power unit comprises an engine. The engine comprises a crankshaft. The engine also comprises a first case that defines a clutch chamber. The clutch chamber houses a centrifugal clutch. The centrifugal clutch is positioned generally rearward of the crankshaft. The engine further comprises a second case that defines a transmission chamber. A continuously variable transmission is provided within the transmission chamber. The continuously variable transmission comprises a primary sheave and a secondary sheave. The primary sheave is driven by the crankshaft. The secondary sheave is arranged generally coaxially with the centrifugal clutch. A flexible transmitting member extends around the primary and secondary sheaves. A support member is disposed generally below the first case. A first foot rest and a second foot rest are positioned to a first lateral side of the engine and a second lateral side of the engine respectively. The first and second foot rests are supported by the support member. The first case comprises an underside from which a plurality of bosses depends downward. The plurality of bosses is positioned generally below the centrifugal clutch and each of the plurality of bosses comprises a lower end face to which the support member is secured.

A further aspect of the present invention involves a motorcycle that comprises a frame with a power unit that is suspended from the frame. The engine comprises a case. The case defines a clutch chamber. A centrifugal clutch is positioned within the clutch chamber. A support member is disposed below the case of the power unit. The support member is connected to a first foot rest and a second foot rest. The first and second foot rests are positioned to lateral sides of the case. The case comprises an underside. A plurality of bosses protrudes downward from a portion of the underside. The portion is disposed generally below the centrifugal clutch and the support member is secured to the bosses.

BRIEF DESCRIPTION OF THE DRAWINGS

These and other features, aspects and advantages of the present invention will now be described with reference to the drawings of several preferred embodiments, which embodiments are intended to illustrate and not to limit the invention, and in which figures.

DETAILED DESCRIPTION OF THE PREFERRED EMBODIMENT

Figure 1:
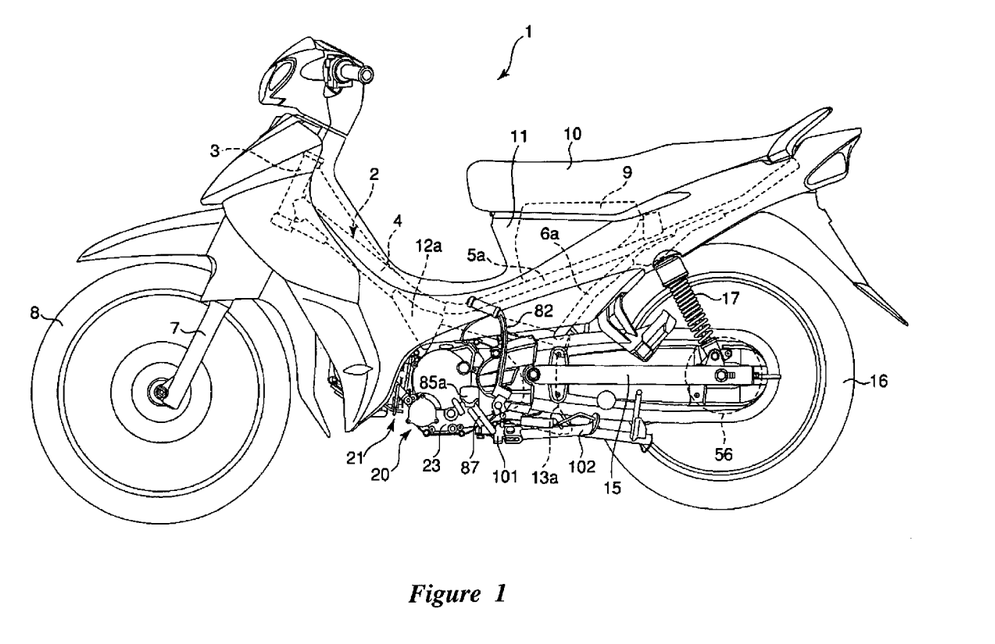
FIG. 1 is a side view of a motorcycle that is arranged and configured in accordance with certain features, aspects and advantages of the present invention.

With reference now to FIG. 1, a motorcycle 1 having a backbone type frame 2 is illustrated therein. While the present invention will be disclosed in the context of the illustrated motorcycle, or scooter, the present invention may have utility with other types of vehicles. The frame 2 preferably comprises a steering head pipe 3, a single main frame member 4, left and right seat rails 5a, 5b and left and right seat pillar tubes 6a, 6b.

The steering head pipe 3 preferably is located at the front end of the frame 2. The steering head pipe 3 can supports a front wheel 8 via a front fork 7. The main frame member 4 forms the primary structure of the frame 2. In some configurations, the main frame member 4 can be formed of, for example, a steel pipe having a generally circular cross-section. The main frame member 4 preferably extends rearward from the steering head pipe 3 and can be inclined downward as it extends rearward from the steering head pipe 3.

The seat rails 5a, 5b preferably extend rearward from an intermediate portion of the main frame member 4 and can be spaced from each other in the transverse direction (i.e., the vehicle width direction). The seat pillar tubes 6a, 6b can connect the rear end of the main frame member 4 to intermediate portions of the seat rails 5a, 5b. In this manner, the seat pillar tubes 6a, 6b can support the seat rails 5a, 5b from below.

A fuel tank 9 and a rider's seat 10 can be supported on the seat rails 5a, 5b. The fuel tank 9 can be located on the front halves of the illustrated seat rails 5a, 5b. The seat 10 extends from a position above the fuel tank 9 to the rear ends of the seat rails 5a, 5b. The fuel tank 9 and the frame 2 can be covered with a body cover 11.

Figure 2:
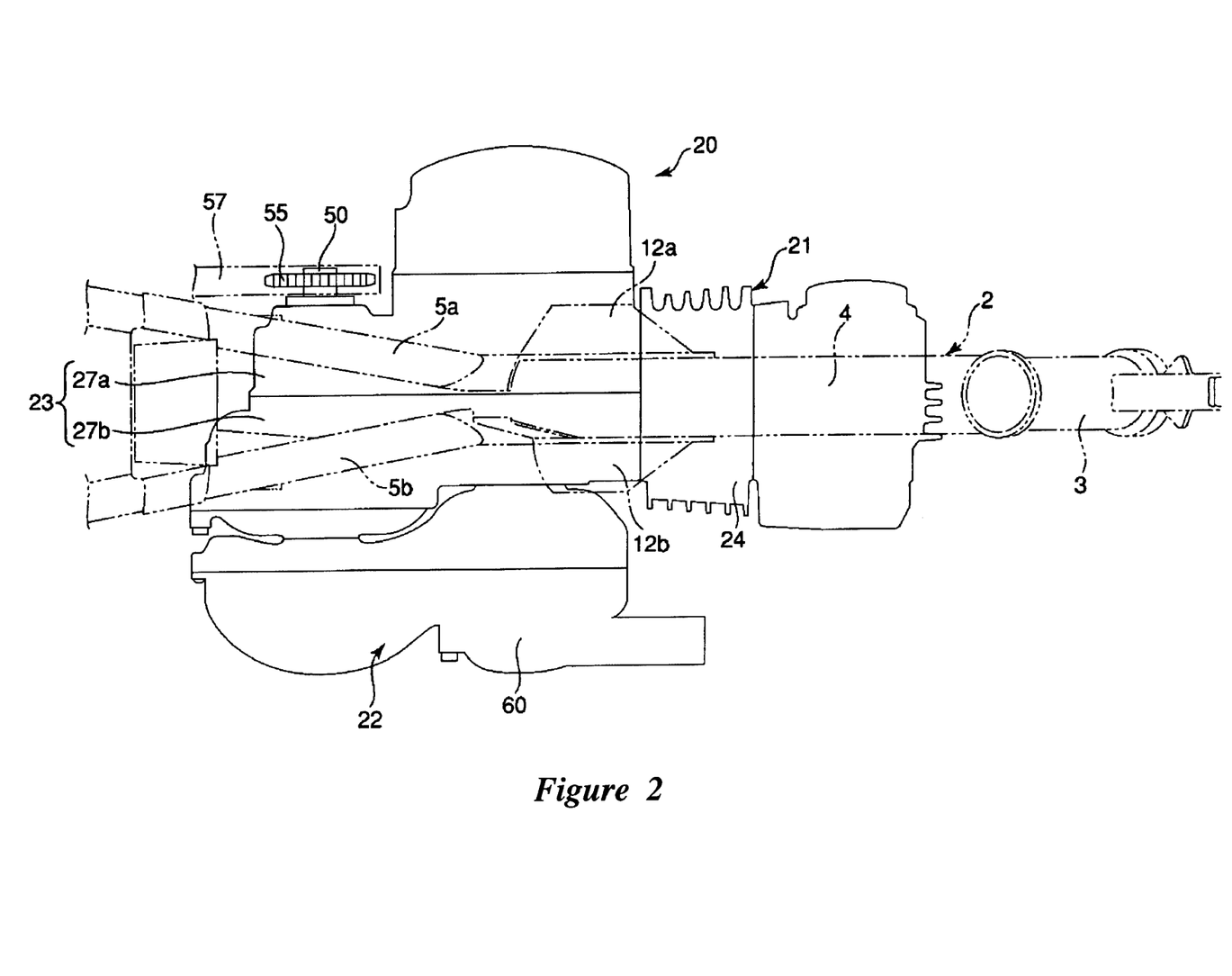
FIG. 2 is a plan view of a portion of the motorcycle of FIG. 1 that illustrates a portion of a frame and a power unit that is mounted to the frame.
Figure 3:
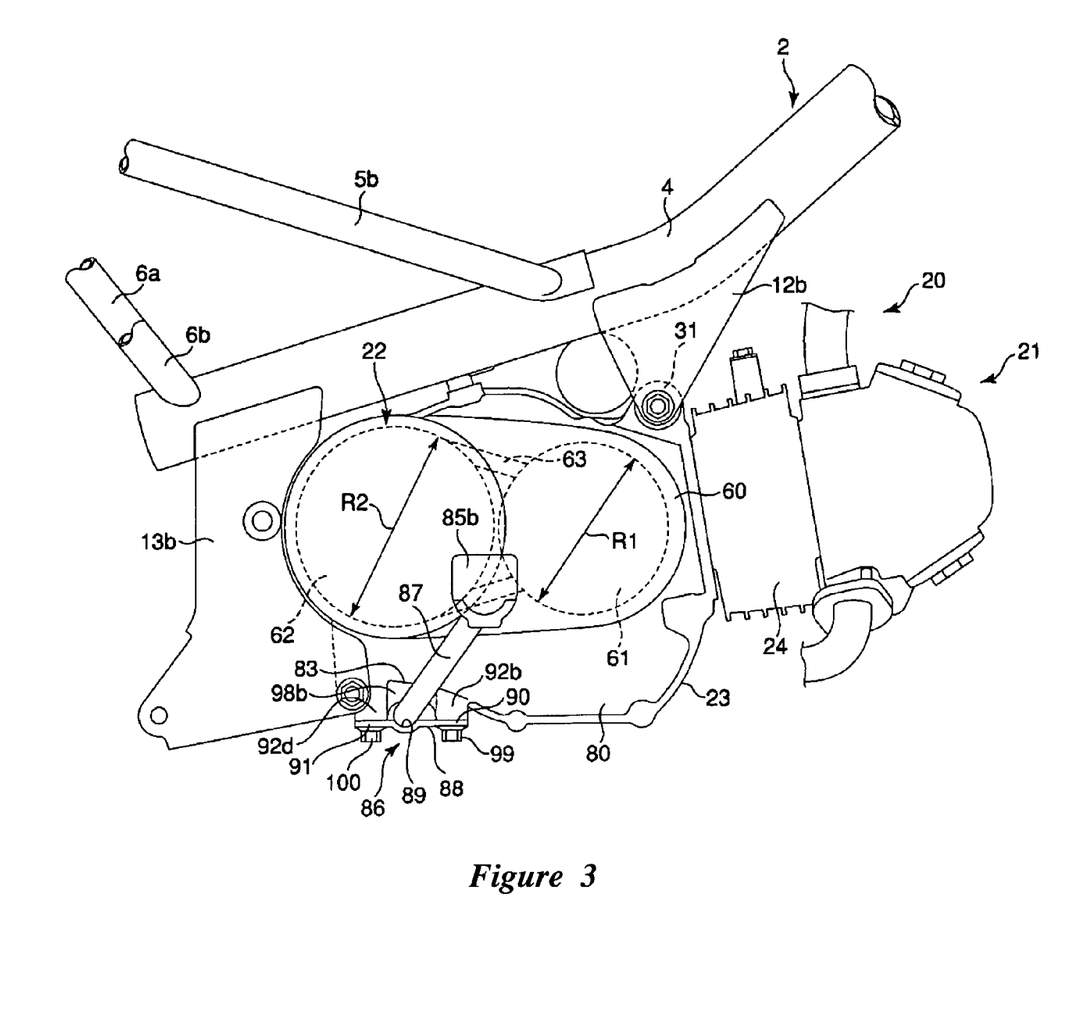
FIG. 3 is a right side view of the portion of the motorcycle of FIG. 1 that is shown in FIG. 2.
Figure 4:
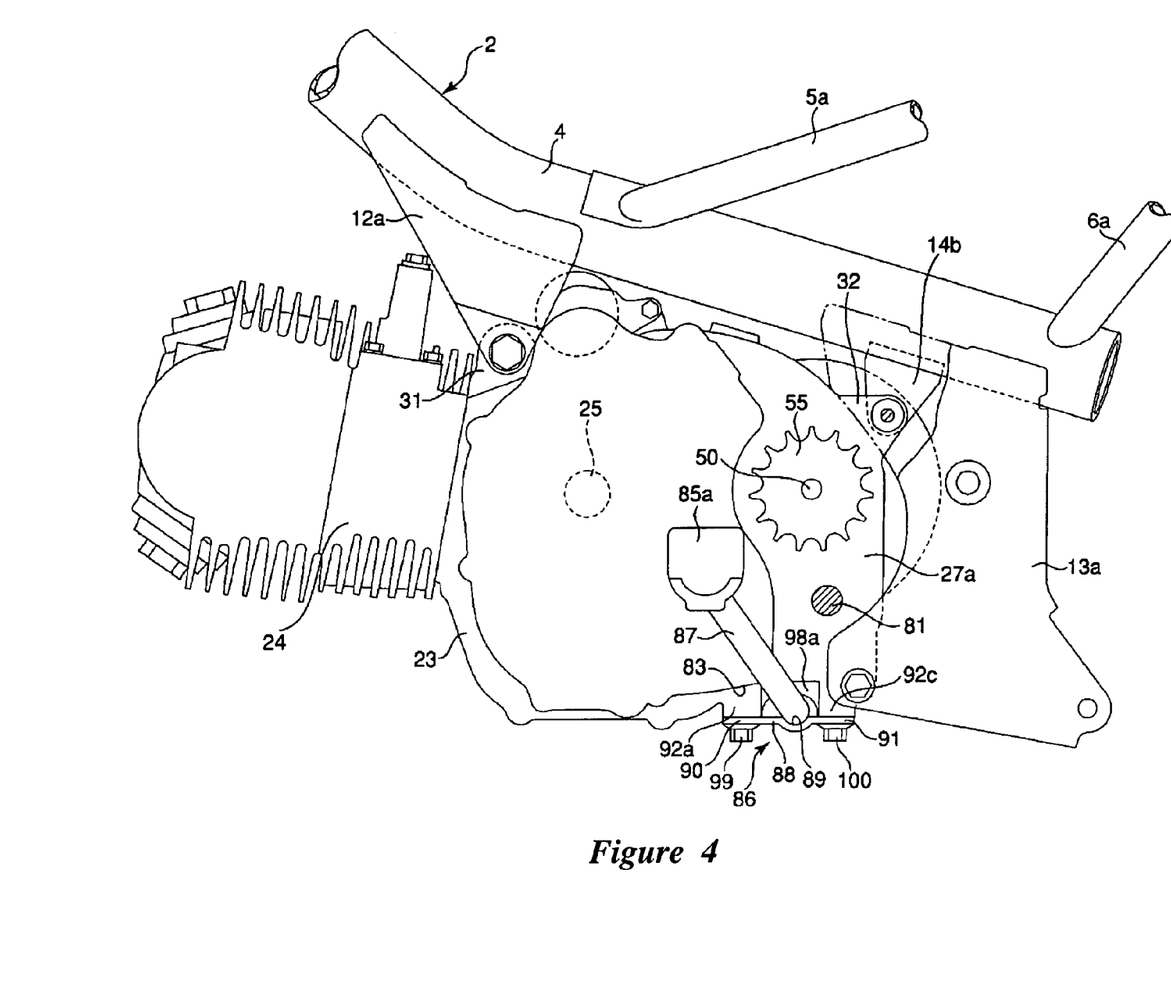
FIG. 4 is a left side view of the portion of the motorcycle of FIG. 1 that is shown in FIG. 2 and that shows a relationship between a foot rest the power unit.

With reference now to FIG. 2 to FIG. 4, a pair of first engine brackets 12a, 12b can be secured to an intermediate portion of the main frame member 4. The first engine brackets 12a, 12b preferably protrude downward from the intermediate portion of the main frame member 4 and generally face each other while being slightly spaced apart in a transverse direction of the vehicle. Other suitable configurations also can be used.

A pair of rear arm brackets 13a, 13b and a pair of second engine brackets 14a, 14b preferably are secured to a rear portion of the main frame member 4. The rear arm brackets 13a, 13b generally protrude downward from the rear portion of the main frame member 4. Similar to the first engine brackets 12a, 12b, the rear arm brackets 13a, 13b preferably generally face each other while being slightly spaced apart in a transverse direction of the vehicle. In the illustrated configuration, the rear arm brackets 13a, 13b support a rear arm 15 that extends rearward from the rear arm brackets 13a, 13b. A rear wheel 16 can be supported by the rear arm 15. In the illustrated configuration, the rear wheel 16 is supported at the rear end of the rear arm 15 but other suitable configurations also can be used. The rear end of the rear arm 15 preferably is suspended by the frame 2 via an oil damper 17 or other suitable suspension component.

Figure 6:
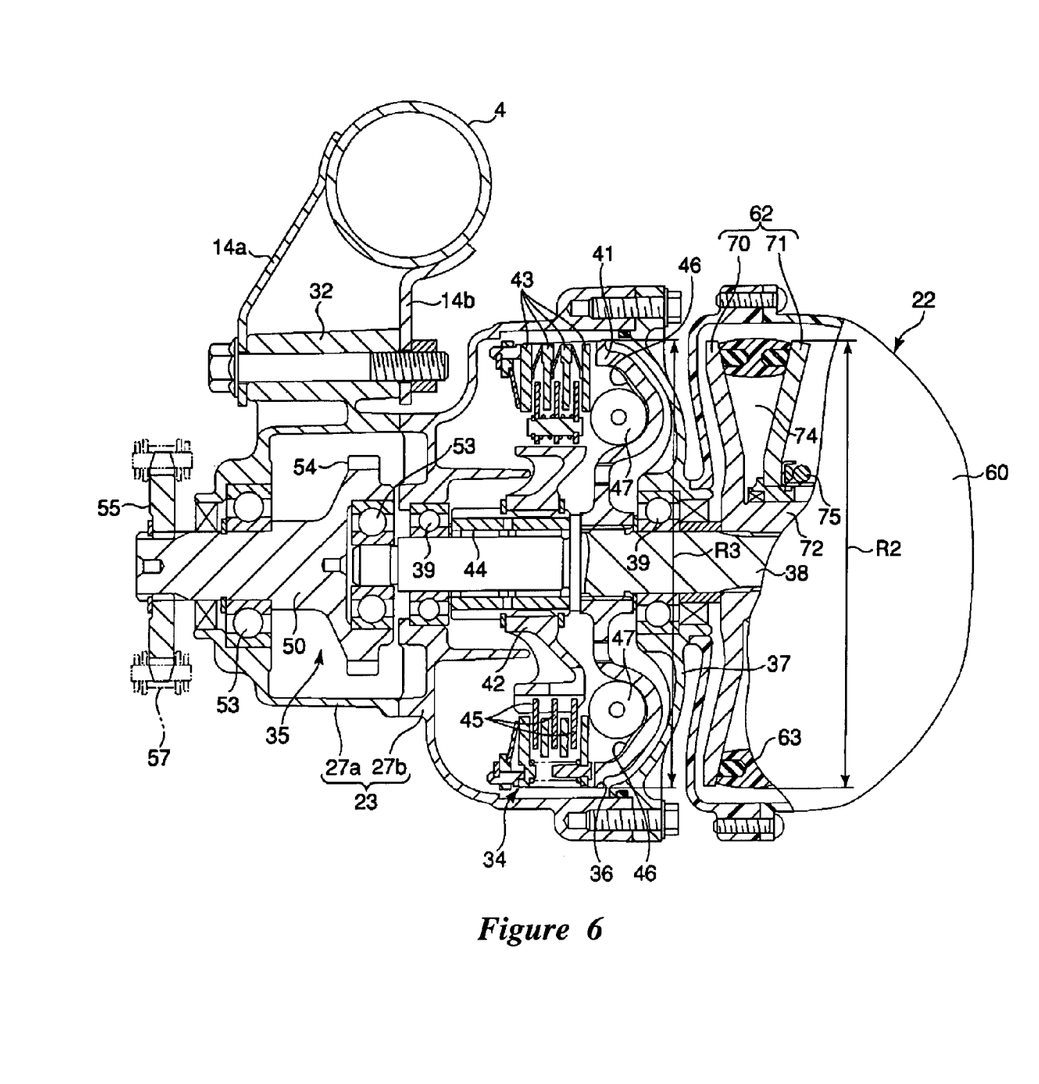
FIG. 6 is a cross-sectional view of a portion of the power unit of the motorcycle of FIG. 1 that illustrates the relative positions of a secondary sheave of a continuously variable transmission and a centrifugal clutch.

With reference now to FIG. 4, the second engine brackets 14a, 14b can be located between the front ends of the rear arm brackets 13a, 13b. As shown in FIG. 6, the second engine brackets 14a, 14b extend downward from the rear end of the main frame member 4 and generally face each other while being spaced apart in the transverse direction.

The frame 2 described above preferably supports a power unit 20. The power unit 20 is used to supply motive power to drive at least one of the wheels. In the illustrated configuration, the power unit 20 is used to drive the rear wheel 16. The illustrated power unit 20 comprises a four-cycle single-cylinder engine 21 and a continuously variable transmission (hereinafter referred to as CVT) 22. Preferably, the CVT 22 comprises a belt or chain drive configuration. Other configurations of engines and other configurations of transmissions also can be used. For instance, the drive source of the power unit may be a motor or a hybrid module in which a motor and an engine are combined, for example.

Figure 5:
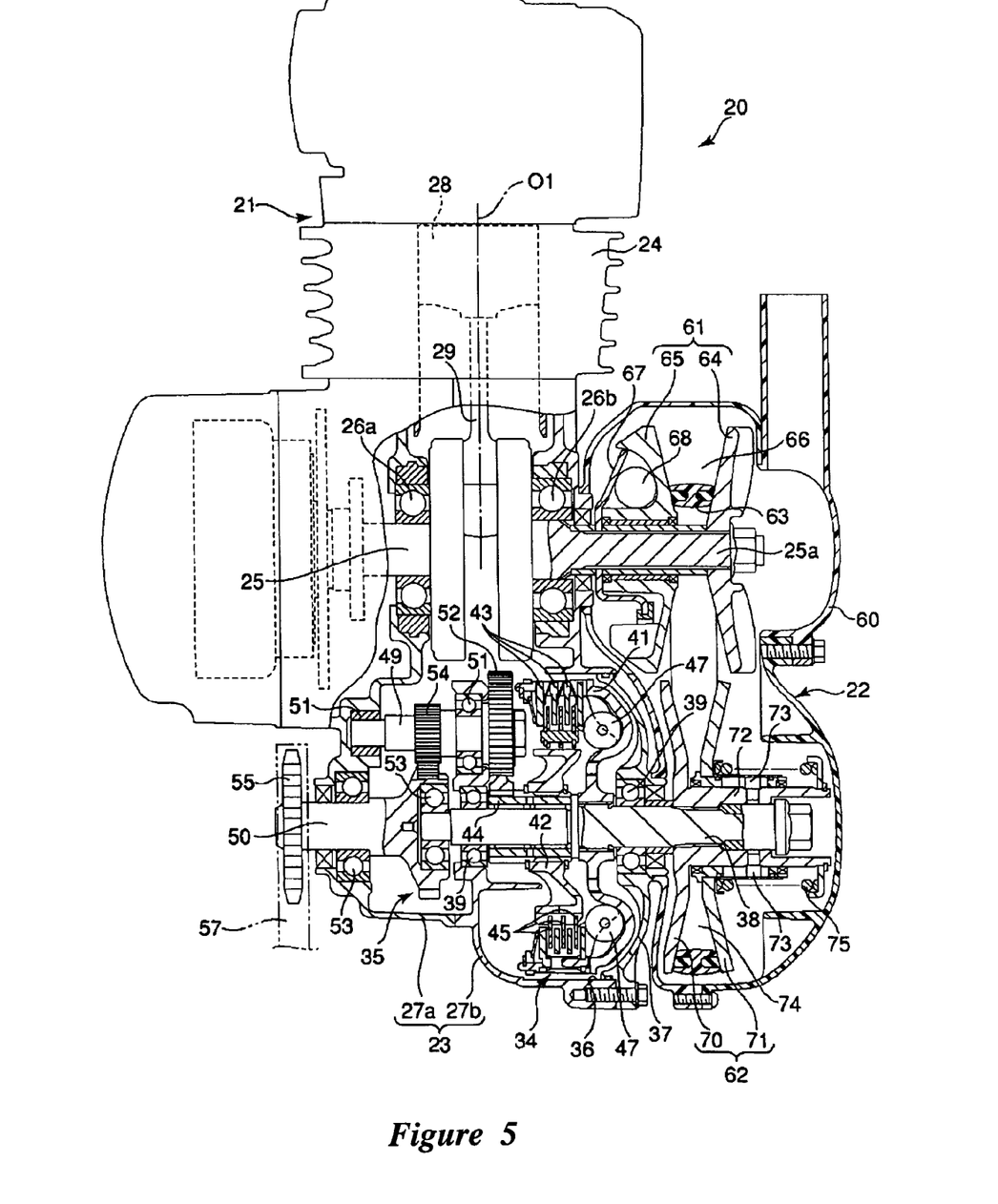
FIG. 5 is a cross-sectional view of a portion of the power unit of the motorcycle of FIG. 1.

With reference now to FIG. 5, the engine 21 preferably comprises a crankcase 23 and a cylinder 24 that is connected to the crankcase 23. In the illustrated configuration, the crankcase 23 houses a crankshaft 25. The crankshaft 25 can be supported by the crankcase 23 by bearings 26a, 26b and can extend generally horizontally in the transverse direction.

The illustrated crankcase 23 comprises a first case portion 27a and a second case portion 27b. The first and second case portions 27a, 27b also may be referred to as the first and second case blocks 27a, 27b herein. The first and second case blocks 27a, 27b can be coupled together along a generally longitudinally extending seam. In other words, the first and second case blocks 27a, 27b can be secured together side-by-side or one beside the other in the transverse direction of the motorcycle 1. However, the crankcase can be divided into upper and lower case blocks in some configurations.

With reference again to FIG. 4, the cylinder 24 preferably protrudes forward from a forward end of the crankcase 23. The illustrated cylinder 24 more preferably extends generally horizontally and comprises an axis 01 that extends generally in the longitudinal direction of the power unit 20. The cylinder 24 houses a piston 28 in the illustrated configuration. The piston 28 can be connected to the crankshaft 25 by a connecting rod 29. Other suitable configurations also can be used.

With reference to FIG. 3 and to FIG. 4, the crankcase 23 of the engine 21 preferably comprises a first engine mount part and a second engine mount parts 31, 32. The first engine mount part 31 preferably extends generally upward from a forward portion of the top face of the crankcase 23. The first engine mount preferably is supported by the first engine brackets 12a, 12b. The second engine mount part 32 preferably extends generally upward from the rear portion of the top face of the crankcase 23. The second engine mount part 32 can be supported by the second engine brackets 14a, 14b. In this way, the crankcase 23 can be suspended from the main frame member 4. Other engine mounting configurations are possible; however, the illustrated configuration advantageously allows the engine to be mounted fairly low without having a frame member underlying the engine, which allows the heavier engine to be positioned lower and which allows the center of gravity to be lowered.

With reference to FIG. 5 and FIG. 6, the crankcase 23 preferably houses a centrifugal clutch 34 and a gear transmission 35. The centrifugal clutch 34 and the gear transmission 35 preferably are located in a rearward portion of the crankcase 25. In one configuration, the centrifugal clutch 34 can be housed in the rear portion of the second case block 27b of the crankcase 23. The second case block 27b preferably comprises an opening 36 that enables the insertion and removal of the centrifugal clutch 34, such as during maintenance operations. The opening 36 in the illustrated configuration opens at the right side of the rear portion of the second case block 27b. A clutch cover 37 can be used to close the opening 36. Other suitable configurations also can be used.

With reference still to FIG. 5, the centrifugal clutch 34 preferably is supported on an output shaft 38. The output shaft 38 can be supported by the clutch cover 37 and the second case block 27b via bearings 39. Preferably, the output shaft 38 extends generally parallel to the crankshaft 25. In the illustrated configuration, the right end of the output shaft 38 extends through the clutch cover 37 and extends to the right side of a CVT case 60.

In the illustrated configuration, the centrifugal clutch 34 comprises a generally cylindrical clutch housing 41 and a clutch boss 42. The clutch housing 41 preferably is supported on the output shaft 38. In the illustrated configuration, the clutch housing 41 rotates with the output shaft 38. Other configurations also can be used.

In the illustrated embodiment, the clutch housing 41 supports a plurality of ring-shaped clutch plates 43. The clutch plates 43 can be rotated with the clutch housing 41 and can be arranged coaxially in the axial direction of the output shaft 38 with intervals defined between the clutch plates 43.

The clutch boss 42 preferably is located inside the clutch plates 43 and the output shaft 38 preferably extends through the center of the clutch boss 42. A generally cylindrical intermediate shaft 44 can be interposed between the clutch boss 42 and the output shaft 38. The intermediate shaft 44 preferably is supported on the output shaft 38 and can rotate with the clutch boss 42. In one configuration, the intermediate shaft 44 is engaged with the clutch boss.

In the illustrated configuration, the clutch boss 42 supports a plurality of ring-shaped friction plates 45. The friction plates 45 rotate with the clutch boss 42 and preferably are interposed between the clutch plates 43.

As illustrated, the clutch housing 41 comprises one or more cam faces 46. Roller weights 47 can be interposed between the cam faces 46 and one of the clutch plates 43 that faces toward the cam faces 46. The roller weights 47 move in the radial direction of the clutch housing 41 in proportion to the centrifugal force generated by the rotation of the clutch housing 41. More specifically, when the centrifugal force applied to the roller weights 47 reaches a predetermined value, the roller weights 47 start moving radially outward on the cam faces 46. As the roller weights 47 move outward, the roller weights 47 press against the clutch plates 43. As a result, the clutch plates 43 and the friction plates 45 are brought into contact with each other and the centrifugal clutch 34 engages such that torque can be transmitted through the centrifugal clutch 34. When the centrifugal force applied to the roller weights 47 decreases, the roller weights 47 move radially inward. The contact between the clutch plates 43 and the friction plates 45 releases with the radially inward movement of the roller weights 47 and the centrifugal clutch 34 disengages such that the centrifugal clutch no longer transmits torque.

The gear transmission 35 preferably is located at the output end of the centrifugal clutch 34. The illustrated gear transmission 35 comprises a first speed changing shaft 49 and a second speed changing shaft 50. The first speed changing shaft 49 is supported by a rear portion of the crankcase 23 by a plurality of bearings 51 and is located between the crankshaft 25 and the output shaft 38. An input gear 52 is secured to the first speed changing shaft 49. The input gear 52 preferably engages with the intermediate shaft 44. Because of the meshing engagement, the clutch boss 42 of the centrifugal clutch 34 and the first speed changing shaft 49 rotate together.

The second speed changing shaft 50 is supported by a rear portion of the first case block 27a of the crankcase 23 and the left end of the output shaft 38 via bearings 53. Advantageously, the second speed changing shaft 50 is generally coaxial with the output shaft 38 such that the gear transmission 35 can be compactly configured. A speed changing gear train 54 can be interposed between the first speed changing shaft 49 and the second speed changing shaft 50. Thus, the torque of the first speed changing shaft 49 can be transmitted to the second speed changing shaft 50 via the speed changing gear train 54.

In the illustrated configuration, the left end of the second speed changing shaft 50 protrudes to the left side of the crankcase 23. A drive sprocket 55 can be secured to the left end of the second speed changing shaft 55. A chain 57 can be entrained around the drive sprocket 55 and a driven sprocket 56 of the rear wheel 16. Other final transmission arrangements also can be used.

With reference still to FIG. 4, FIG. 5 and FIG. 6, the centrifugal clutch 34 and the gear transmission 35 advantageously are located within a rearward portion of the crankcase 23 and are arranged generally in the same axial direction as the output shaft 38. The clutch housing 41 of the centrifugal clutch 34 preferably is formed to be larger in diameter than the input gear 52 and the respective gears of the speed changing gear train 54. In other words, if the clutch housing 41 is viewed in the axial direction of the output shaft 38, the input gear 52 and the respective gears of the speed changing gear train 54 generally do not extend beyond the region defined by the outer diameter of the clutch housing 41. Thus, the outer periphery of the clutch housing 41 is larger than the geared transmission.

With reference to FIG. 5, the CVT 22 is mounted on the right side face of the second case block 27b of the crankcase 23 in the illustrated embodiment. Other configurations also are possible. The CVT 22 preferably comprises a CVT case 60, a primary sheave 61, a secondary sheave 62, and a belt 63.

With reference to FIG. 3, the illustrated CVT case 60 generally comprises a hollow box-like shape that extends generally in the longitudinal direction of the power unit 20. With reference to FIG. 5, a journal part 25a at the right end of the illustrated crankshaft 25 and at the right end of the illustrated output shaft 38 extend into the CVT case 60. The CVT case 60 houses the primary sheave 61, the secondary sheave 62, and the belt 63.

The primary sheave 61 can be located at the front end in the CVT case 60 and can be supported on the journal part 25a at the right end of the illustrated crankshaft 25. The primary sheave 61 has a fixed sheave half 64 and a movable sheave half 65. The fixed sheave half 64 is secured to the end of the journal part 25a and rotates with the crankshaft 25. The movable sheave half 65 is supported with the journal part 25a and is slidable toward and away from the fixed sheave half 64. The moveable sheave half 64 also is rotatable in a circumferential direction of the journal part 25*a*.

A first belt groove 66 is defined between the fixed sheave half 64 and the movable sheave half 65. The width of the first belt groove 66 is adjustable by sliding the movable sheave half 65. As the width varies, the belt moves radially inward and outward along the primary sheave 61.

A cam plate 67 is fixed on the journal part 25*a*. The cam plate 67 rotates together with the crankshaft 25 and faces the movable sheave half 65. The cam plate 67 and the movable sheave half 65 rotate together and these components can move toward and away from each other.

A plurality of roller weights 68 (only one of them is shown) are interposed between the cam plate 67 and the movable sheave half 65. The roller weights 68 move in the radial direction of the cam plate 67 by centrifugal forces generated by the rotation of the crankshaft 25. This movement causes the movable sheave half 65 to slide in the axial direction of the journal part 25*a* such that the width of the first belt groove 66 can be varied.

The secondary sheave 62 can be located in the rear portion of the CVT case 60. In the illustrated configuration, the secondary sheave is supported on the right end of the output shaft 38. The secondary sheave 62 comprises a fixed sheave half 70 and a movable sheave half 71. The illustrated fixed sheave half 70 comprises a cylindrical collar 72 around its center of rotation. The collar 72 preferably engages with the right end of the output shaft 38 such that the fixed sheave half 70 will rotate with the output shaft 38. The movable sheave half 71 can be mounted on the collar 72 such that it can slide in the axial direction of the output shaft. A plurality of engaging pins 73 preferably engage the moveable sheave half 71 with the collar 72. Thus, the movable sheave half 71 rotates with the fixed sheave half 70 and moves toward and away from the fixed sheave half 70.

A second belt groove 74 is defined between the fixed sheave half 70 and the movable sheave half 71. The width of the second belt groove 74 can be adjusted by sliding the movable sheave half 71 along the output shaft 38. The movable sheave half 71 is urged toward the fixed sheave half 70 by a compressed coil spring 75.

The belt 63 transmits the torque of the primary sheave 61 to the secondary sheave 62. The belt 63 is stretched between the first belt groove 66 of the primary sheave 61 and the second belt groove 74 of the secondary sheave 62. Any suitable type of flexible transmitter can be used, including by not limited to rubber belts, metal belts, steel belts, bands, ropes, rings or the like.

When the rotational speed of the crankshaft 25 is low, such as when the engine 21 is idling, the roller weights 68 are positioned close to the center of rotation of the primary sheave 61. Thus, the movable sheave half 65 is positioned farthest away from the fixed sheave half 64 and the diameter at which the belt 63 rides on the primary sheave 61 is generally minimized. Also, the movable sheave half 71 of the secondary sheave 62 is urged toward the fixed sheave half 70 by the compression coil spring 75, which increases the diameter at which the belt rides on the secondary sheave 62. In such a position, the illustrated CVT 22 has its maximum transmission ratio.

As the rotational speed of the crankshaft 25 increases, the centrifugal force applied to the roller weights 68 increases. Thus, the roller weights 68 start moving radially outward along the movable sheave half 65. This outward movement causes the movable sheave half 65 to slide toward the fixed sheave half 64 and the width of the first belt groove 66 decreases. As a result, the belt 63 is pushed radially along the primary sheave half 61 and the diameter at which the belt 63 rides on the primary sheave 61 increases. Concurrently, the belt 63 is pulled toward the center of rotation of the secondary sheave 62. The movable sheave half 71, therefore, slides away from the fixed sheave half 70 against the urging force of the compression coil spring 75 and the width of the second belt groove 74 increases. Thus, the diameter at which the belt 63 rides on the secondary sheave 62 decreases. The transmission ratio of the CVT 22, therefore, decreases, and, when the diameter at which the belt 63 rides on the primary sheave 61 reaches the maximum value, the transmission ratio of the CVT 22 is minimized.

The torque transmitted from the primary sheave 61 to the secondary sheave 62 is transmitted from the fixed sheave half 70 of the secondary sheave 62 to the clutch housing 41 of the centrifugal clutch 34 via the output shaft 38. The centrifugal clutch 34 is engaged when centrifugal force applied to the roller weights 47 by rotation of the clutch housing 41 reaches a predetermined value. Once the clutch is engaged, the torque of the engine 21 is transmitted from the clutch housing 41 to the gear transmission 35 through the intermediate shaft 44 and then to the rear wheel 16 through the chain 57.

In the illustrated embodiment, torque is transmitted from the secondary sheave 62 of the CVT 22 to the centrifugal clutch 34 and then to the rear wheel 16 via the gear transmission 35 and the chain 57. In other words, when the engine 21 is stopped, the torque transmission path from the CVT 22 to the rear wheel 16 is interrupted by the centrifugal clutch 34. Thus, when the motorcycle 1 with the engine 21 stopped is moved by pushing, for example, the CVT 22 does not rotate along with the rear wheel 16. Therefore, the motorcycle 1 can be pushed with less force, facilitating handling and maneuvering of the motorcycle 1.

With reference to FIG. 3, a diameter R2 of the secondary sheave 62 is designed to be larger than a diameter R1 of the primary sheave 61. With reference to FIG. 6, the secondary sheave 62 preferably is arranged generally coaxially with the clutch housing 41 of the centrifugal clutch 34. More preferably, the secondary sheave 62 has a center of rotation that is generally coaxial with the centrifugal clutch. A diameter R3 of the clutch housing 41 preferably is designed to be generally equal to the diameter R2 of the secondary sheave 62. Thus, the clutch housing 41 and the secondary sheave 62 are among the largest components, in diameter, of those that define a power transmission path from the crankshaft 25 to the second speed changing shaft 50.

Figure 9:
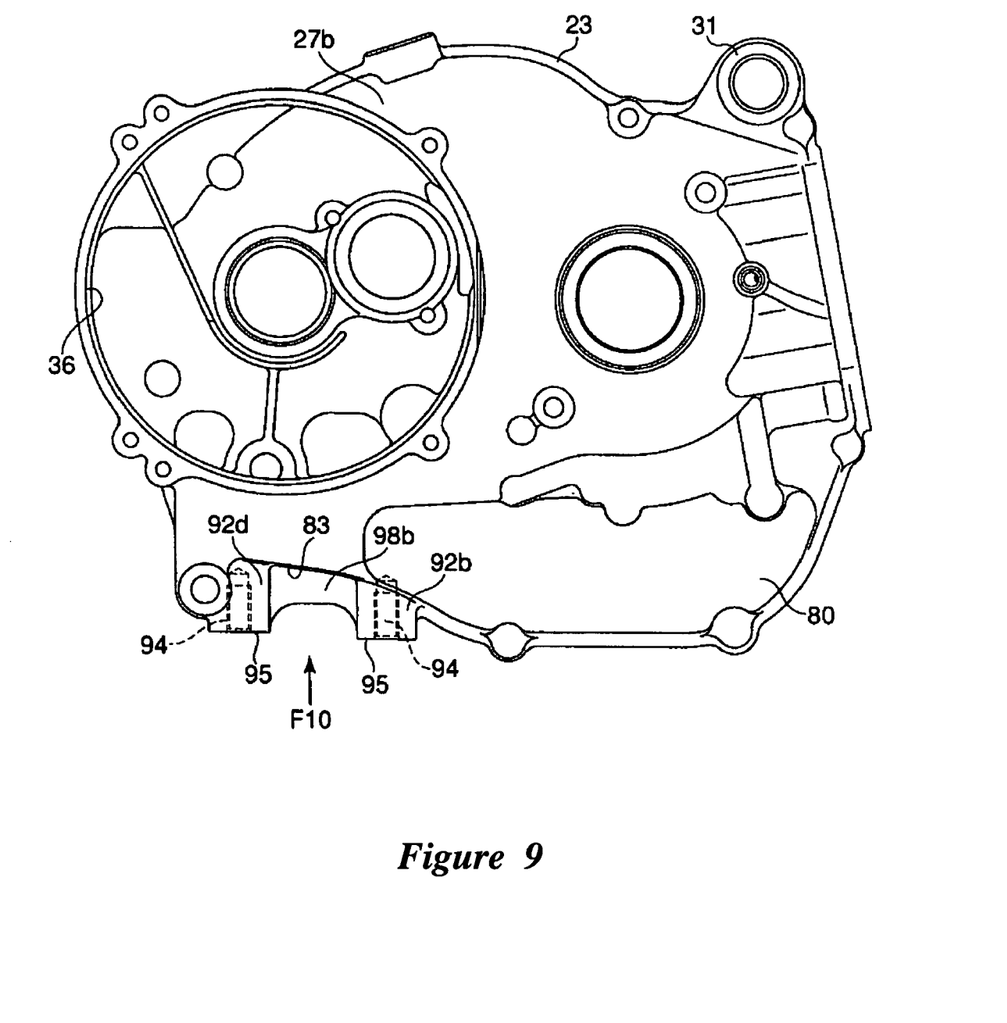
FIG. 9 is a right side view of a crankcase that is arranged and configured in accordance with certain features, aspects and advantages of the present invention.

With reference now to FIG. 3 and FIG. 9, the crankcase 23 preferably comprises an oil pan 80. The oil pan 80 can be located in the front half of the crankcase 23. Preferably, the oil pan 80 expands downward relative to the crankshaft 25. In the illustrated position, the oil contained within the oil pan can be more readily circulated and returned to the oil pan while not unnecessarily increasing the vertical dimension of the power unit or requiring the transfer of the oil to an external tank.

Figure 7:
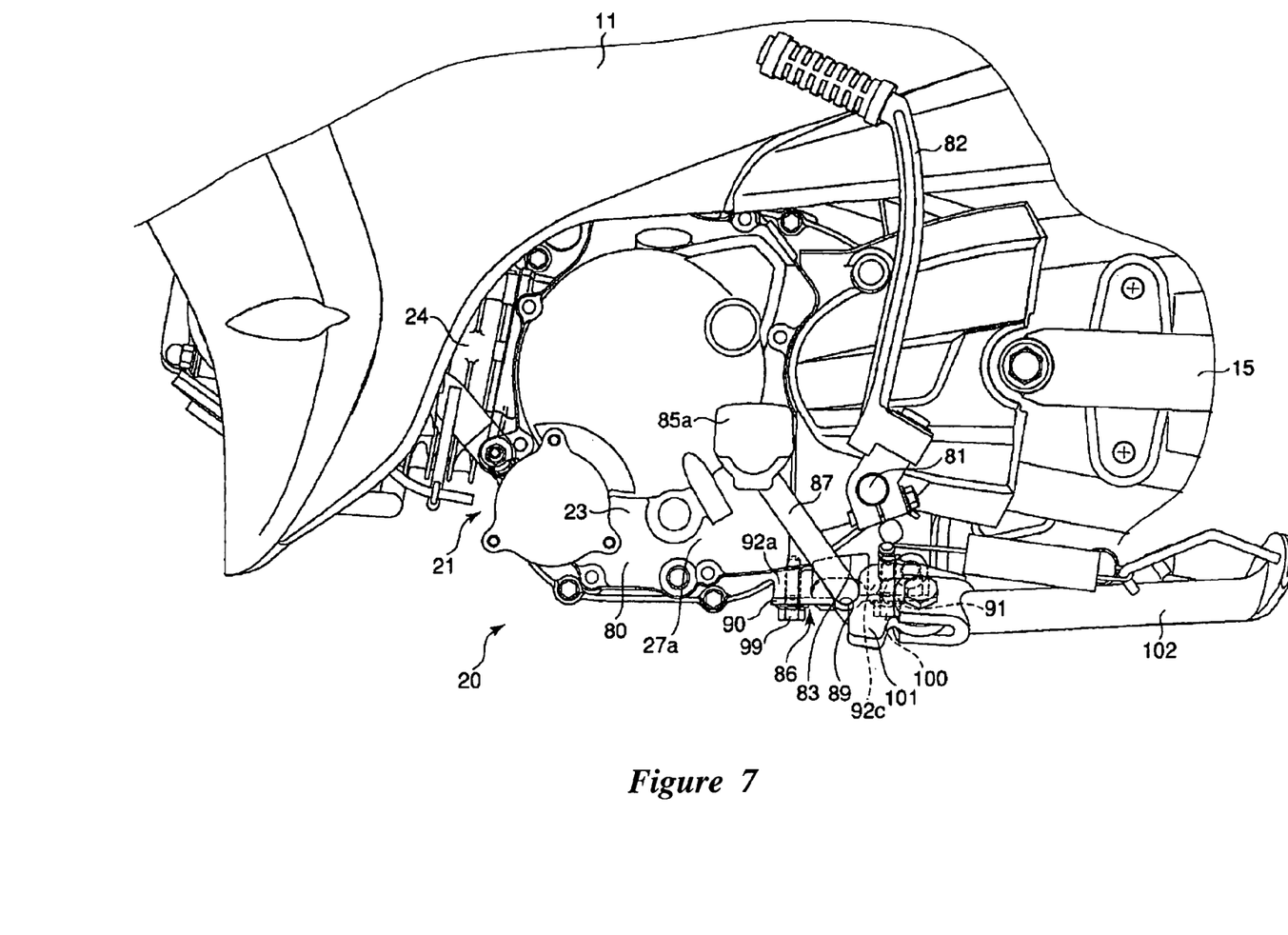
FIG. 7 is a left side view of the motorcycle of FIG. 1 that illustrates an example of the relative positions of the power unit, the foot rest, a kick crank, and a side stand.

With reference to FIG. 7, the rear half of the crankcase 23 also can house a kick shaft 81. The kick shaft 81 preferably is supported for rotation by the first case block 27*a*. The kick shaft 81 also preferably extends in the transverse direction. In the illustrated embodiment, the kick shaft 81 protrudes to the left side of the crankcase 23 and has a kick crank 82 that is attached to the protruding end thereof. As is known, the kick shaft 81 can engage with the crankshaft 25 via a plurality of starter gears (not shown). The kick shaft 81 preferably is located below the second speed changing shaft 50 and can be located at generally the same height as the lower end of the clutch housing 41 on the crankcase 23.

With reference to FIG. 7, the rear half of the crankcase 23 preferably comprises an underside 83 that is located below the centrifugal clutch 34 and the kick shaft 81. The underside 83 extends transversely across at least a portion of the first case block 27a and the second case block 27b. In a preferred configuration, the underside 83 extends fully across the first case block 27a and the second case block 27b.

Figure 8:
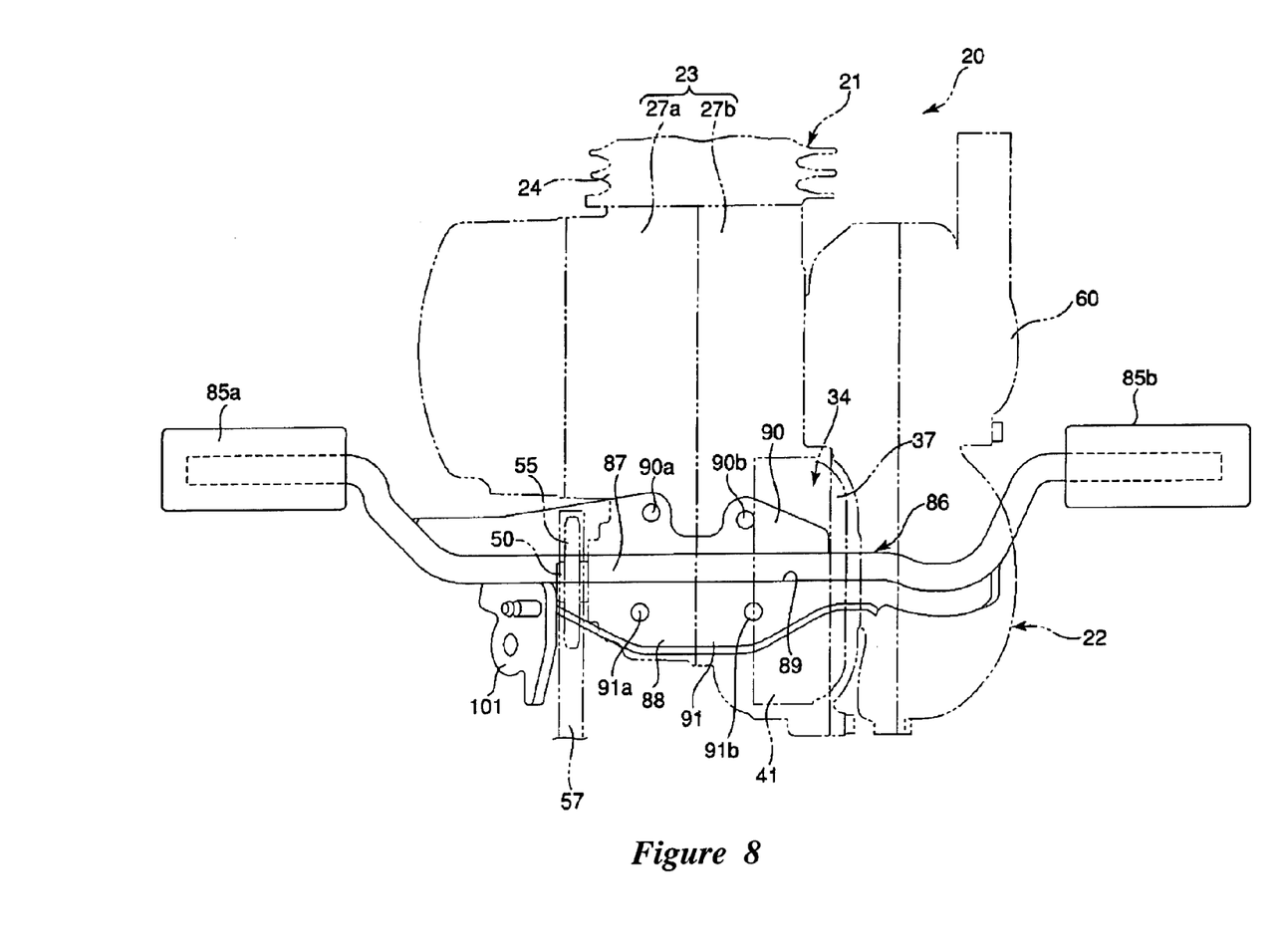
FIG. 8 is a simplified plan view of the motorcycle of FIG. 1 that illustrates the relative positions of the power unit, the left and right foot rests, and the support member.

As shown in FIG. 8, foot rests 85a, 85b preferably are disposed on the left and right lateral sides of the crankcase 23. The foot rests 85a, 85b are intended to support the feet of the rider and positioned with respect to the seat 10 such that the rider can take a suitable riding position. In some configurations, the foot rests 85a, 85b comprise a rubberized portion while, in other configurations, the foot rests 85a, 85b are generally metal.

In the illustrated embodiment, a support member 86 connects the left and right foot rests 85a, 85b to the crankcase 23. In one preferred configuration, the support member 86 is formed of a metal material. The support member 86 preferably comprises a coupling rod 87 that generally extend connecting between the foot rests 85a, 85b and a mount plate 88 (see FIG. 4) that is secured to the coupling rod 87 in any suitable manner.

With reference to FIG. 8, the coupling rod 87 passes below the rear half of the crankcase 23 and extends in the transverse direction. One end of the coupling rod 87 preferably extends beyond the left side of the crankcase 23 and supports the foot rest 85a while the other end of the coupling rod 87 preferably extends beyond the right side of the CVT 22 and supports the foot rest 85b. Thus, the coupling rod 87 and the second mount part 91 can function as a guard or skid plate for protecting the CVT 22. Therefore, the CVT 22 can be better protected against substantial damage, especially when the motorcycle 1 is operated offroad or over unpaved roads.

The mount plate 88 preferably is formed by pressing a metal plate and forming a recess 89 that receives a longitudinally intermediate portion of the coupling rod 87. The recess 89 more preferably fits the intermediate portion of the coupling rod 87 from below and can be welded to the outer periphery of the coupling rod 87. In some configurations, the coupling rod 87 can comprise a left portion and a right portion that are joined by the mount plate 88 but that are defined by two or more separate members.

The illustrated mount plate 88 comprises a flange-like first mount part 90 that extends generally forward of the coupling rod 87 and a flange-like second mount part 91 that extends generally rearward of the coupling rod 87. The first and second mount parts 90, 91 more preferably extend in the axial direction of the coupling rod 87 and face the underside 83 of the rear half of the crankcase 23. The first and second mount parts 90 respectively comprise a pair of through holes 90a, 90b, and 91a, 91b. The through holes 90a, 90b, and 91a, 91b more preferably are respectively spaced apart from each other in the axial direction of the coupling shaft 87.

As shown in FIG. 8, the right end of the coupling rod 87 and the right end of the second mount part 91 preferably extend laterally to a position generally below the rear end of the CVT 22. Thus, the CVT case 60 of the CVT 22 is covered with the coupling rod 87 and the second mount part 91 from below at a position directly below the secondary sheave 62.

Figure 10:
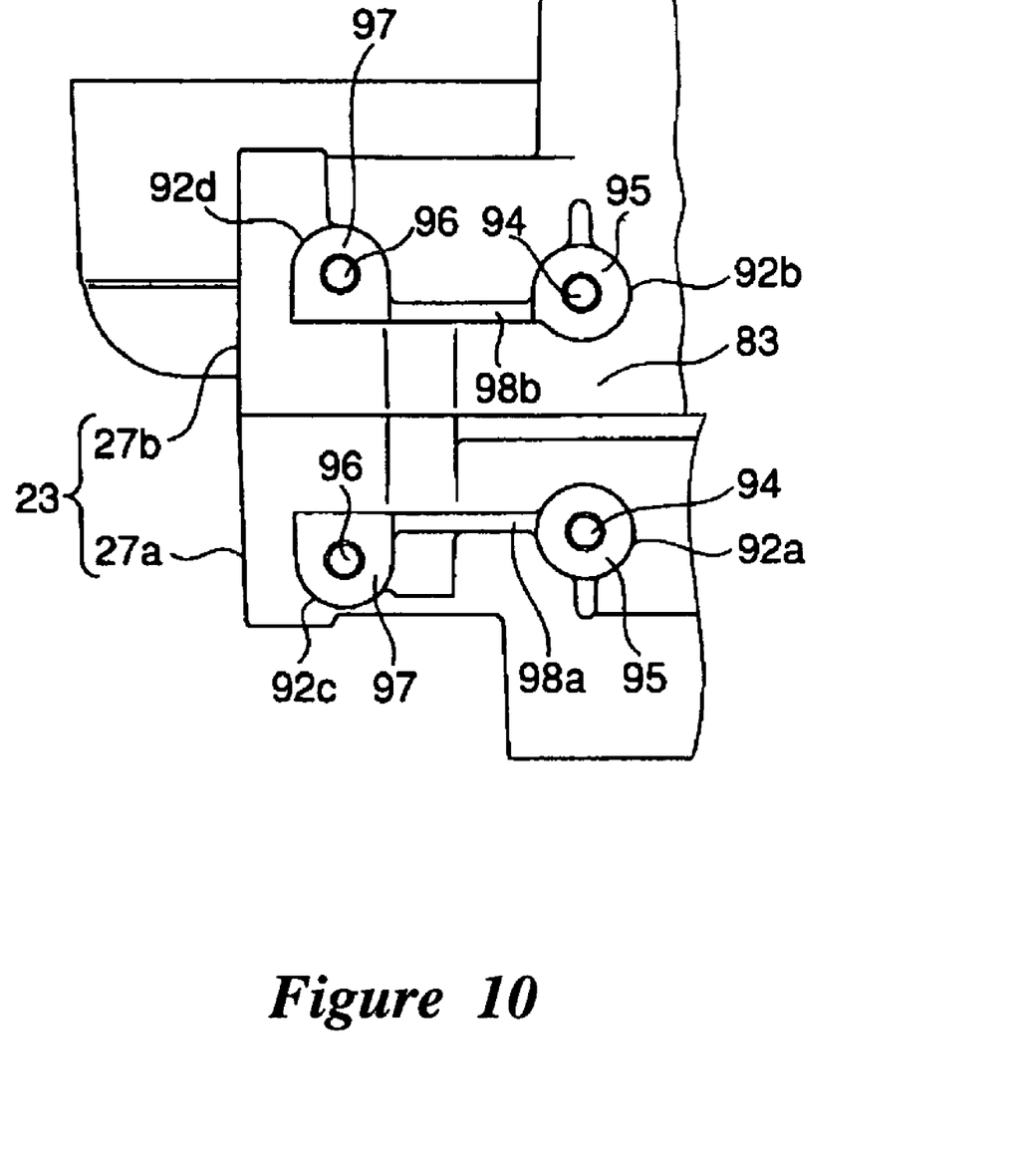
FIG. 10 is a view of the crankcase shown in FIG. 9 and taken in the direction of the arrow F10 in FIG. 9.

With reference now to FIG. 9 and FIG. 10, the underside 83 of the rear portion of the crankcase 23 has multiple bosses. In the illustrated configuration, the rear half of the crankcase 23 comprises four bosses 92a, 92b, 92c, 92d. The bosses are used to support the mount plate 88. The bosses 92a, 92b, 92c, 92d preferably are formed integrally with the crankcase 23 and protrude downward from the underside 83 of the crankcase 23. In some configurations, the bosses can be separate components that are secured to the underside of the crankcase 23. In the illustrated configuration, the first and third bosses 92a, 92c protrude from the first case block 27a, and the second and fourth bosses 92b, 92d protrude from the second case block 27b.

The first and second bosses 92a, 92b correspond to the through holes 90a, 90b of the first mount part 90 and are spaced apart from each other in the transverse direction of the crankcase 23. The bosses 92a, 92b preferably have a lower end face 95 through which a screw hole 94 extends. The third and fourth bosses 92c, 92d correspond to the through holes 91a, 91b of the second mount part 91 and are spaced apart from each other in the transverse direction of the crankcase 23. The bosses 92c, 92d preferably have a lower end face 97 through which a screw hole 96 extends.

The first boss 92a and the third boss 92c as well as the second boss 92b and the fourth boss 92d preferably are arranged in the longitudinal direction of the crankcase 23. In the illustrated configuration, reinforcing ribs 98a, 98b respectively connect the first boss 92a and the third boss 92c in one pair and the second boss 92b and the fourth boss 92d in another pair. The reinforcing ribs 98a, 98b preferably are formed integrally with the crankcase 23 and extend downward from the underside 83 of the crankcase 23. Other configurations also can be used to lend added support to the bosses.

The first mount part 90 of the mount plate 88 preferably abuts on the lower end faces 95 of the first and second bosses 92a, 92b from below the crankcase 23. The through holes 90a, 90b of the first mount part 90 advantageously coincide with the screw holes 94 of the first and second bosses 92a, 92b. Bolts 99 can be inserted through the through holes 90a, 90b from below the crankcase 23. The bolts 99 can be screwed into the screw holes 94. By tightening the bolts 99, the first mount part 90 is secured to the first and second bosses 92a, 92b.

The second mount part 91 of the mount plate 88 preferably abuts on the lower end faces 97 of the third and fourth bosses 92c, 92d from below the crankcase 23. The through holes 91a, 91b of the second mount part 91 advantageously coincide with the screw holes 96 of the third and fourth bosses 92c, 92d. Bolts 100 can be inserted through the through holes 91a, 91b from below the crankcase 23. The bolts 100 are screwed into the screw holes 96. By tightening the bolts 99, the second mount part 91 is secured to the third and fourth bosses 92c, 92d.

Thus, the support member 86 for supporting the foot rests 85a, 85b are secured to the crankcase 23 via the four bolts 99, 100, which are positioned at the corners of a square. Advantageously, the mount plate 88 for the support member 86, which supports the foot rests 85a, 85b, is secured with threaded members 99, 100 to the first to fourth bosses 92a to 92d that extend downward from the underside 83 of the rear portion of the crankcase 23. Moreover, the support member 86, in particular the mount part 90, spans two portions of crankcase 23 and adds further structural integrity to the joining of the first and second blocks 27a, 27b.

Preferably, a stand bracket 101 is welded to an end of the coupling rod 87. In one configuration, the stand bracket 101 is welded to a left end of the coupling rod 87. The stand bracket 101 can be located on the left side of the crankcase 23 and advantageously supports a side stand 102.

The rear half of the crankcase 23 houses the large-diameter clutch housing 41 of the centrifugal clutch 34 and the kick shaft 81, which is located near the lower end of the clutch housing 41. Thus, the rear portion of the crankcase 23 extends downward and the underside 83 of the crankcase 23 is relatively low. Accordingly, by forming the first to fourth bosses 92a to 92d on the underside 83 of the crankcase 23, the length of the bosses 92a to 92d can be greatly reduced, which improves the strength of the bosses 92a to 92d. In other words, the first to fourth bosses 92a to 92d can adequately support the load applied thereto from the foot rests 85a, 85b without necessarily requiring special reinforcement measures. Therefore, the foot rests 85a, 85b can be firmly supported while the structure of the crankcase 23 is simplified. In some configurations, only one boss may be used rather than a plurality and only one threaded fastener may be used in conjunction, for instance but without limitation, a pin or other member to limit rotation of the plate relative to the crankcase.

Figure 11:
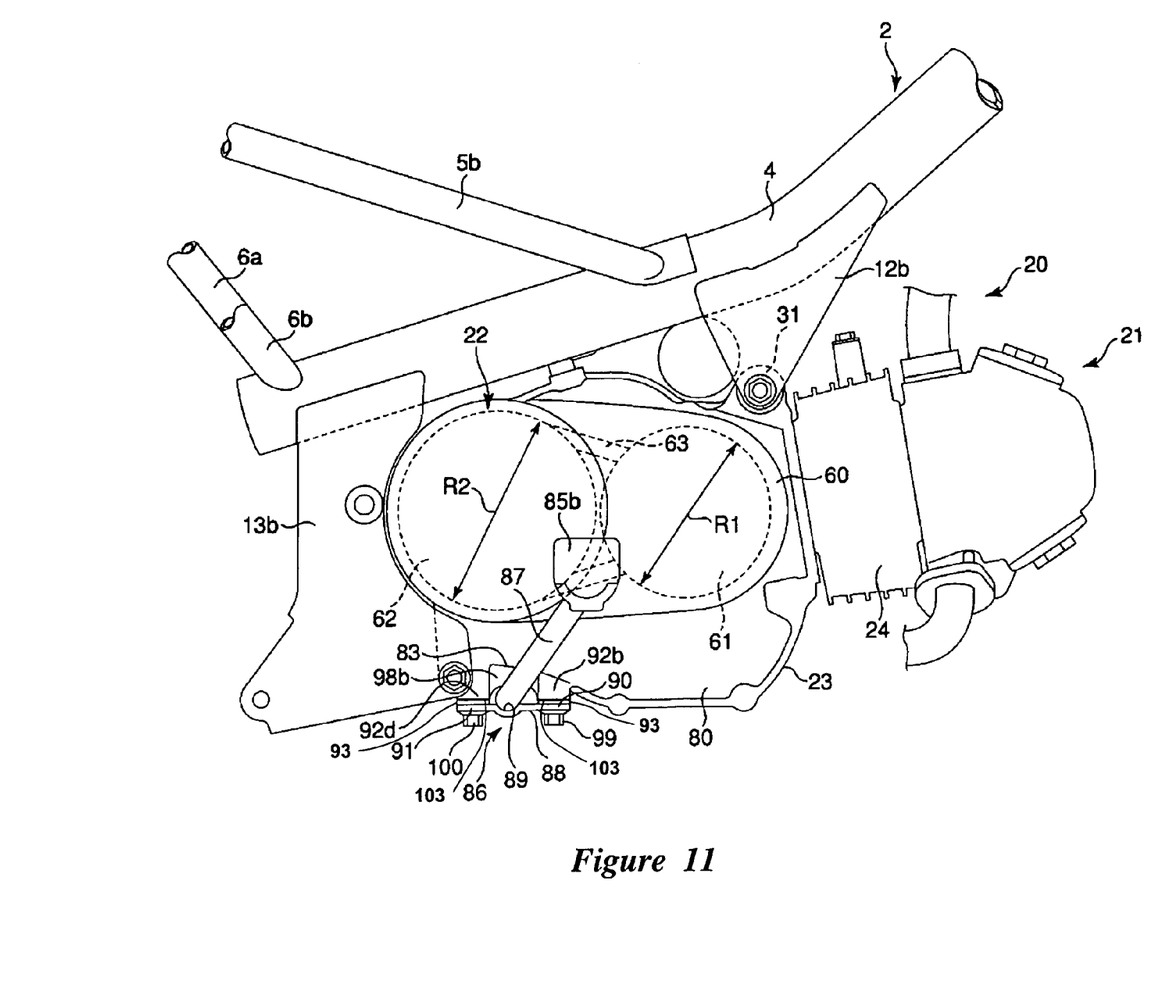
FIG. 11 is a right side view similar to that of FIG. 3 of another motorcycle that is arranged and configured in accordance with certain features, aspects and advantages of the present invention.
Figure 12:
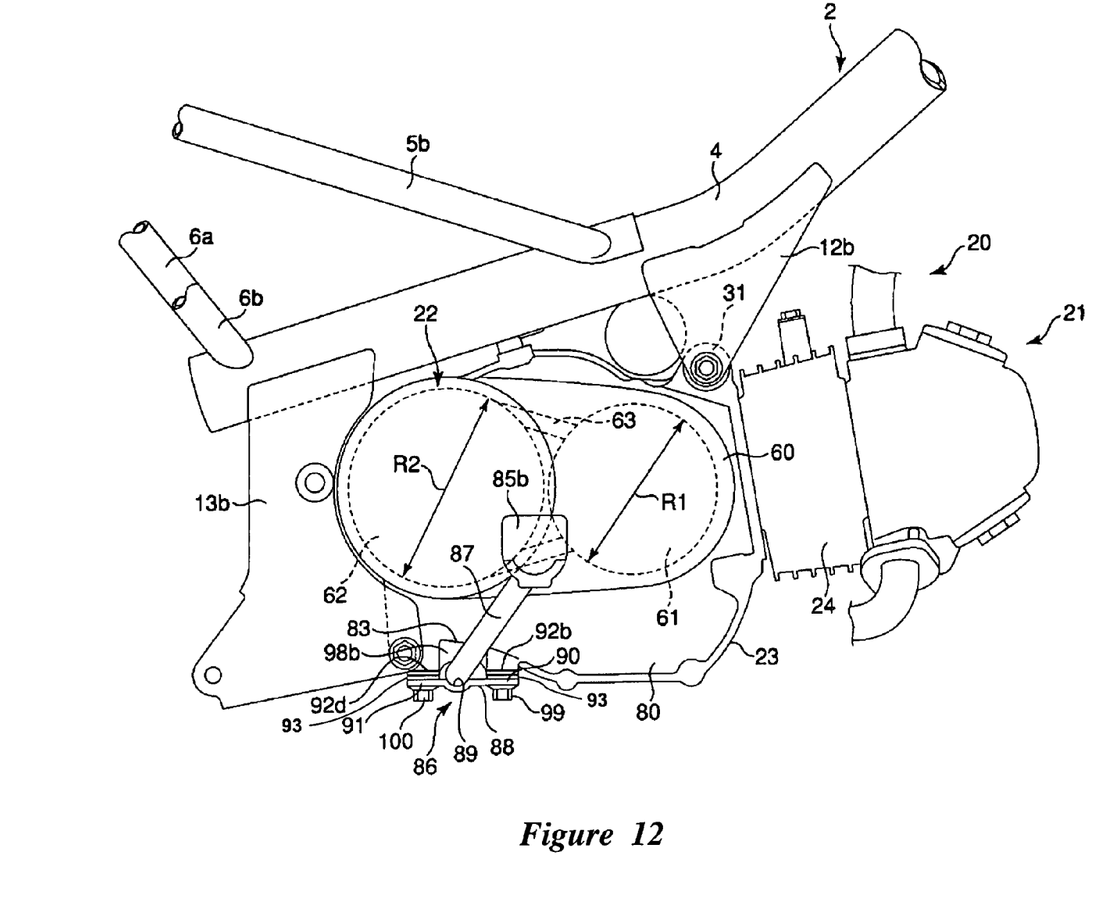
FIG. 12 is a right side view similar to that of FIG. 3 and FIG. 11 of a further motorcycle that is arranged and configured in accordance with certain features, aspects and advantages of the present invention.

With reference now to FIG. 11 and FIG. 12, two further embodiments are illustrated that are arranged and configured in accordance with certain features, aspects and advantages of the present invention. FIG. 11 presents a construction similar to that shown in FIG. 3; however, in the arrangement of FIG. 11, a vibration reduction element 93 is positioned between the mount plate 88 and the crankcase 23. More preferably, one or more vibration reduction elements 93 are provided. In the illustrated configuration, the vibration reduction element 93 is formed in at least two portions with one portion positioned between the first mount part 90 and the associated bosses 92c, 92d and another portion positioned between the second mount part 91 and the associated bosses 92a, 92b. In one other configuration, the vibration reduction element 93 can be formed in four portions with a separate portion being associated with each boss 92a, 92b, 92c, 92d. The vibration reduction element 93 can comprise a resilient component, formed of a rubberized material or the like. Advantageously, such a construction can reduce the transmission of engine vibration to the feet of a rider.

With reference to FIG. 12, a further construction similar to that shown in FIG. 3 and FIG. 11 is provided; however, in the arrangement of FIG. 12, the vibration reduction element 93 is positioned between the mount plate 88 and an additional plate component 103 that is mounted to the crankcase 23. As described above, the vibration reduction element 93 can comprise one, two or more pieces. Similarly, the plate component 103 can be formed as a single member that is interposed between the vibration reduction element 93 and the crankcase 23. In the illustrated configuration, the plate component 103 comprises a first part that is positioned between the vibration reduction element 93 and the first and second bosses 92a, 92b and a second part that is positioned between the vibration reduction element 93 and the third and fourth bosses 92c, 92d. The first part and the second part can be distinct components or can be formed as a single component depending upon the application. In some configurations, the vibration reduction element 93 and the mount plate 88 can be secured to the plate component 103, which is then used to couple the mount plate 88 and the vibration reduction elements 93 to the crankcase. Advantageously, such a configuration can reduce the transmission of engine vibration to the feet of a rider while also providing a subassembly that can be easily installed or removed for repair or replacement.

In some configurations, not illustrated, the vibration reduction element 93 can have other structures. For instance, the vibration reduction element 93 is shown in a generally plate-like configuration. In one configuration, the vibration reduction element can be formed as an insert that can extend between a threaded fastener and an opening in the mount plate 88, the associated bosses 92a, 92b, 92c, 92d or both. In another configuration, the vibration reduction element 93 can comprise a washer-type appearance and can be used in a manner similar to a washer in that it will surround a fastener and provide an interfacing member between the mount plate 88 and the crankcase 23.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A power unit for a motorcycle, the power unit comprising a case defining a clutch chamber, the case comprising an underside, a plurality of bosses extending downward from the underside of the case, a centrifugal clutch positioned within the clutch chamber and the plurality of bosses being positioned generally below the centrifugal clutch, a first foot rest being positioned to a first lateral side of the case and a second foot rest being position to a second lateral side of the case, the power unit further comprising a second speed changing shaft, the second speed changing shaft being indirectly connected to the centrifugal clutch, a drive sprocket mounted to said second speed changing shaft, a support member disposed generally vertically below the case and positioned such that the support member and the drive sprocket overlap when viewed from above, the support member being connected to the first and second foot rests and being coupled to the plurality of bosses.

2. The power unit of claim 1, wherein the support member comprises a coupling rod, the coupling rod connecting the first and second foot rests, an axially intermediate portion of the coupling rod being defined between the first and second foot rests, a mount plate being provided at the axially intermediate portion and being secured to the bosses.

3. The power unit of claim 1, wherein the case comprises a first case portion and a second case portion, the first case portion generally houses the centrifugal clutch, the second case portion and the first case portion coupled together with the support member extending across the first and second case portions, and the plurality of bosses is formed on the first and second case portions.

4. The power unit of claim 1 further comprising a vibration reduction element positioned between the support member and the bosses.

5. The power unit of claim 4 further comprising a plate component positioned between the vibration reduction element and the bosses.

6. The power unit of claim 4, wherein the vibration reduction element comprises a first part and a second part, the first part and the second part being separately formed and positioned apart from each other.

7. The power unit of claim 4, wherein the support member comprises a coupling rod, the coupling rod connecting the first and second foot rests, an axially intermediate portion of the coupling rod being defined between the first and second foot rests, a mount plate being provided at the axially intermediate portion and being secured to the bosses with the vibration reduction element being interposed between the mount plate and the bosses.

8. A power unit for a motorcycle, the power unit comprising an engine, the engine comprising a crankshaft, the engine also comprising a first case, the first case defining a clutch chamber, the clutch chamber housing a centrifugal clutch, the centrifugal clutch being positioned generally rearward of the crankshaft, the power unit also comprising a second speed changing shaft, the second speed changing shaft being indirectly connected to the centrifugal clutch, a drive sprocket mounted to said second speed changing shaft, the power unit further comprising a second case, the second case defining a transmission chamber, a continuously variable transmission provided within the transmission chamber, the continuously variable transmission comprising a primary sheave and a secondary sheave, the primary sheave being driven by the crankshaft, the secondary sheave being arranged generally coaxially with the centrifugal clutch, a flexible transmitting member extending around the primary and secondary sheaves, a support member being disposed generally below the first case and positioned such that the support member and the drive sprocket overlap when viewed from above, a first foot rest and a second foot rest being positioned to a first lateral side of the engine and a second lateral side of the engine respectively, the first and second foot rests being supported by the support member, the first case comprising an underside from which at least one boss depends downward, the at least one boss being positioned generally below the centrifugal clutch and each of the at least one boss comprising a lower end face to which the support member is secured.

9. The power unit of claim 8, wherein the secondary sheave has a larger diameter than the primary sheave and the centrifugal clutch has a diameter that is generally the same as the secondary sheave.

10. The power unit of claim 8, wherein the support member comprises a coupling member, the coupling member connecting the first and second foot rests and comprising an axially intermediate portion, a mount plate is provided at the axially intermediate portion of the coupling rod and is secured to the lower end faces of the at least one boss, and the coupling rod extends generally transversely below the secondary sheave of the continuously variable transmission.

11. A motorcycle comprising a frame, a power unit being suspended from the frame, the power unit comprising a case, the case defining a clutch chamber, a centrifugal clutch positioned within the clutch chamber, the power unit also comprising a second speed changing shaft, the second speed changing shaft being indirectly connected to the centrifugal clutch, a drive sprocket mounted to said second speed changing shaft, a support member being disposed below the case of the power unit and positioned such that the support member and the drive sprocket overlap when viewed from above, the support member connected to a first foot rest and a second foot rest, the first and second foot rests being positioned to lateral sides of the case, the case comprises an underside, a plurality of bosses protrude downward from a portion of the underside, the portion being disposed generally below the centrifugal clutch, and the support member being secured to the bosses.

12. The motorcycle of claim 11, wherein the power unit comprises an engine, the engine comprising a cylinder coupled to the case, and the power unit further comprises a continuously variable transmission, the continuously variable transmission comprising a primary sheave driven by the engine and a secondary sheave arranged generally coaxially with the centrifugal clutch, the primary sheave and the secondary sheave being connected by a flexible transmitter, the secondary sheave having a diameter that is generally larger than a diameter of the primary sheave and the centrifugal clutch having a diameter that is generally equal to the diameter of the secondary sheave.

13. The motorcycle of claim 12, wherein the support member comprises a coupling rod that extends generally transversely at a location generally below the secondary sheave of the continuously variable transmission, the coupling rod connecting the first and second foot rests, the coupling rod comprising an axially intermediate portion, and a mount plate being provided at the axially intermediate portion and being secured to the bosses such that the coupling rod is connected to the bosses.

14. The motorcycle of claim 11 further comprising at least one vibration reduction element, the at least one vibration reduction element being interposed between the support member and the case of the power unit.

15. The motorcycle of claim 14, wherein the at least one vibration reduction element abuts the plurality of bosses of the power unit and the support member.

16. The motorcycle of claim 14 further comprising at least one plate is interposed between the at least one vibration reduction element and the case of the power unit.

17. The motorcycle of claim 14, wherein the at least one vibration reduction element comprises a resilient material.

18. The motorcycle of claim 17, wherein the at least one vibration reduction element is formed of the resilient material.

19. The motorcycle of claim 18, wherein the resilient material is rubber.

* * * * *